Nov. 14, 1944.   A. PALENSKY   2,362,921
COOKING APPLIANCE
Filed Dec. 23, 1942   2 Sheets-Sheet 1
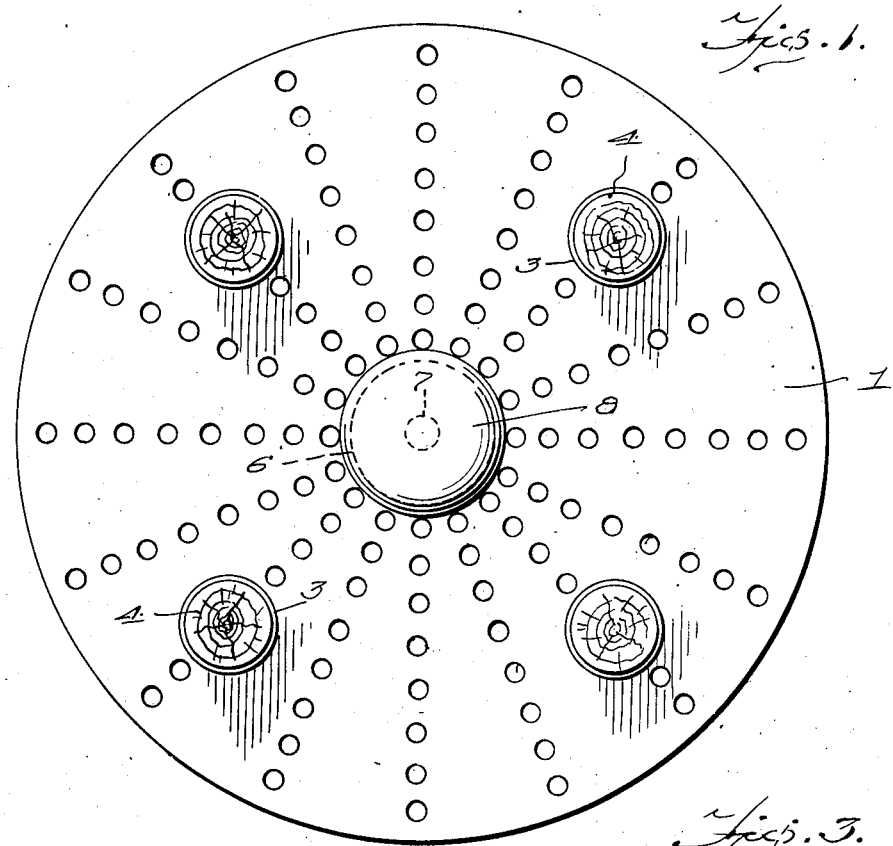
Fig. 1.
Fig. 4.
Fig. 3.
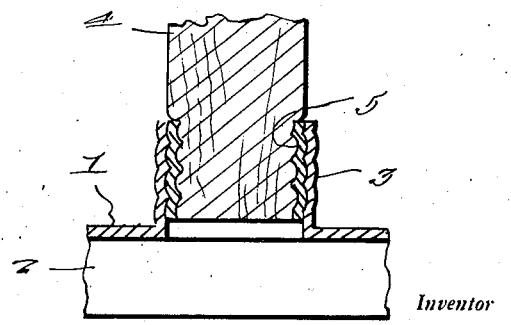
Inventor
Agnes Palensky
By Clarence A. O'Brien
and Harvey B. Jacobson
Attorneys Nov. 14, 1944.  A. PALENSKY  2,362,921
COOKING APPLIANCE
Filed Dec. 23, 1942   2 Sheets-Sheet 2
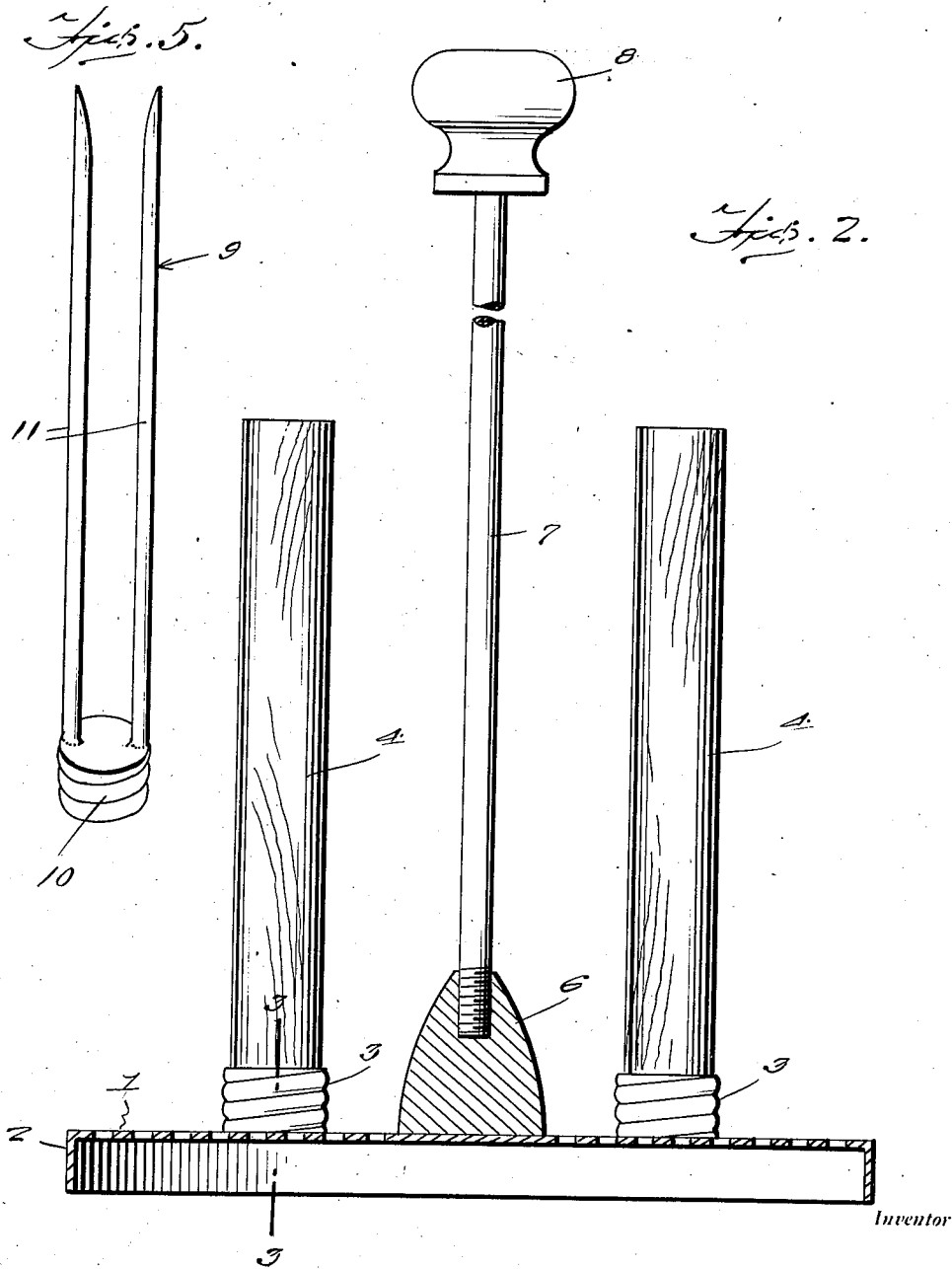
Inventor
Agnes Palensky
By Clarence A. O'Brien
and Harvey B. Jacobson
Attorneys Patented Nov. 14, 1944

2,362,921

UNITED STATES PATENT OFFICE 2,362,921

COOKING APPLIANCE

Agnes Palensky, Vermillion, S. Dak.

Application December 23, 1942, Serial No. 469,965

2 Claims. (Cl. 99—442)

The present invention relates to new and useful improvements in cooking appliances, primarily for doughnuts, and has for one of its important objects to provide, in a manner as hereinafter set forth, means for completely submerging a plurality of doughnuts in the fat.

Another very important object of the invention is to provide an appliance of the aforementioned character for the deep fat frying of doughnuts which eliminates the necessity of turning said doughnuts.

Still another very important object of the invention is to provide an appliance of the character described comprising a novel construction and arrangement whereby the doughnuts may be conveniently and safely removed from the fat.

Other objects of the invention are to provide a deep fat frying appliance which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an appliance constructed in accordance with the present invention.

Figure 2 is a view in vertical section through the device.

Figure 3 is a fragmentary view in vertical section, taken substantially on the line 3—3 of Figure 2.

Figure 4 is an elevational view of the lower portion of one of the mandrels.

Figure 5 is a perspective view of a spit which may be used in lieu of the mandrels.

Referring now to the drawings in detail, it will be seen that the embodiment of the invention which has been illustrated comprises a circular perforated base 1 of suitable material and dimensions. The base 1 includes a peripheral supporting skirt or flange 2. Rising from the base 1 is a plurality of threaded necks 3.

The necks 3 are for the reception of vertical mandrels 4 of suitable wood. The mandrels 4 are removable from the base 1. Toward this end, the mandrels 4 have fixed on their lower end or base portions threaded ferrules 5 which are adapted to be screwed into the necks 3.

Fixed centrally on the base 1 is a substantially dome-shaped, threaded socket 6, said socket being of metal and also constituting a weight. Threadedly connected to the socket 6 is a vertical lifting rod or stem 7 having fixed on its upper end portion a handle 8.

It is thought that the manner of using the device will be readily apparent from a consideration of the foregoing. Briefly, a suitable receptacle is filled to the desired level with fat and the base 1, with the mandrels 4 removed therefrom, is submerged therein through the medium of the rod 7. Strips of dough are then wound on the mandrels 4 and said mandrels are then screwed into the necks 3, thus completely submerging said dough in the fat. Of course, the mandrels 4 and the stem 7 are of sufficient length to project above the surface of the fat in the receptacle. When the doughnuts have been fried the appliance is lifted out of the fat through the medium of the rod 7 and the handle 8, the mandrels 4 are removed from the base 1 and the doughnuts are stripped from said mandrels. It will thus be seen that a spiral doughnut will be had in which various kinds of fillings may be placed.

In Figure 5 of the drawings, a spit for frying meat, fish, et cetera, is indicated at 9. The spit 9 is to be used in lieu of the mandrels 4. The spit 9 includes a threaded lower end portion or base 10 which is adapted to be screwed into the necks 3. Rising from the base 10 is a pair of prongs 11 on which the meat or fish are impaled.

It is believed that the many advantages of an appliance constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A cooking appliance of the character described comprising a perforated circular base including a depending peripheral skirt, threaded necks rising from the base, vertical removable food supporting members threadedly connected to said necks, a socket forming weight member mounted on the base for weighting the base down, a rod threadedly connected to said socket member and rising therefrom, and a handle mounted on the upper end portion of said rod.

2. A cooking appliance comprising a base, threaded necks rising from said base, vertical spits having threaded base portions screwed into the necks and each further including a pair of prongs rising from said base portions, and a rod rising from the first-named base and constituting means for raising and lowering same, said rod being weighted at its lower end to weight the base down.

AGNES PALENSKY.